April 18, 1933.　　　P. MILLER　　　1,904,069
WINDSHIELD VISOR
Filed Oct. 4, 1930
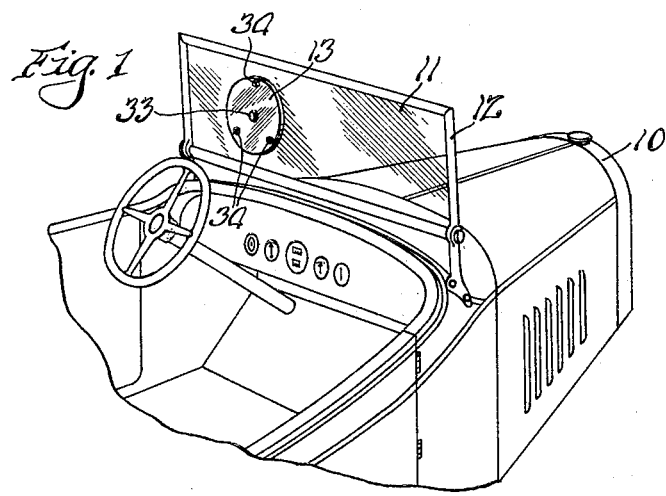
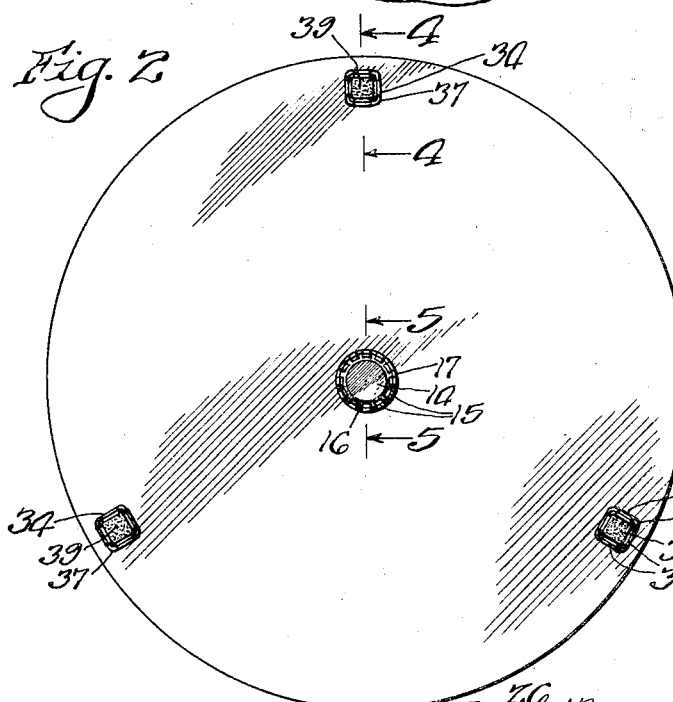
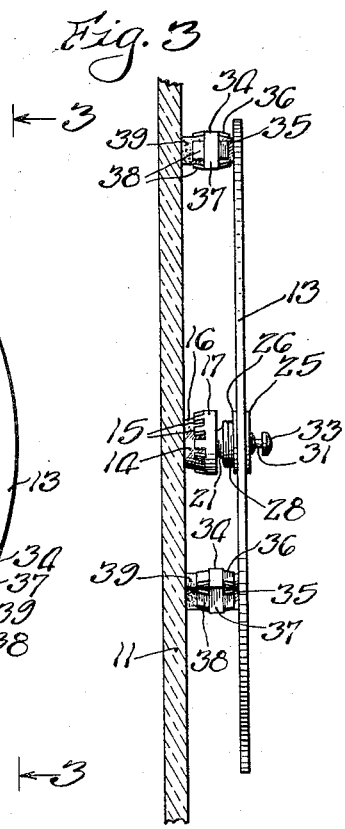
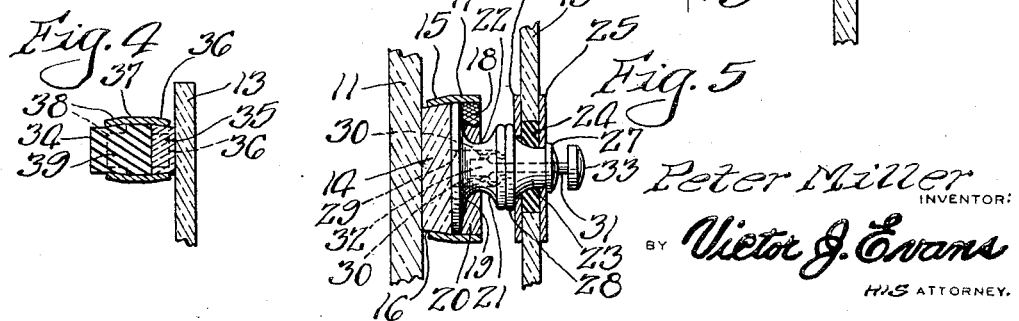
Peter Miller
INVENTOR
BY Victor J. Evans
HIS ATTORNEY Patented Apr. 18, 1933

1,904,069

UNITED STATES PATENT OFFICE

PETER MILLER, OF CHICAGO, ILLINOIS

WINDSHIELD VISOR

Application filed October 4, 1930. Serial No. 486,453.

This invention relates to certain novel improvements in windshield visors, and has for its principal object the provision of an improved construction of this character which will be highly efficient in use and economical in manufacture.

The salient object of the invention is the provision of a novel windshield visor which may conveniently and quickly be attached to and detached from a windshield so as to permit the visor to be mounted in operative position when it is desired to use the same while permitting removal of the visor when its use is not needed or desired such as on dark days, etc.

A further object of the invention is the provision of an improved construction for mounting the visor in operative position in such a manner that the visor will not rattle when in operative position and will be protected from being broken by shocks due to vibration of the vehicle.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view of a typical automobile body showing my invention in operative position;

Fig. 2 is a top plan view of the invention;

Fig. 3 is a side elevational view taken substantially on the line 3—3 in Fig. 2;

Fig. 4 is a vertical view taken substantially on the line 4—4 in Fig. 2; and

Fig. 5 is a sectional view taken substantially on the line 5—5 in Fig. 2.

Referring to the drawing wherein a preferred form of construction of my invention is depicted, generically indicated at 10 is a typical automobile body in which is provided forward of the driver's compartment the transparent window shield 11 carried in a frame 12. My improved device is associated with the window shield 11 which is customarily made of suitable glass. In this invention I provide a disc 13 which may be made of any suitable material that will eliminate the glare of the sun in the driver's eyes and the disc 13 is preferably, though not necessarily colored glass, green being a preferred color although any suitable color may be employed.

My improved device is preferably detachably mounted on the front side of the windshield 11 and the manner of mounting the disc 13 to the glass 11 will now be described. Referring now more particularly to Figs. 3 and 5 it will be seen that there is attached to the windshield glass 11 at a convenient point in front of the driver and steering wheel, and to the front side of the glass 11, a glass disc 14 which is cemented to the windshield glass 11. Provided with a plurality of gripping fingers 15 which engage the tapered edge 16 of the disc 14 is a sleeve 17 on the outer end of which is provided an annular flange 20 having a knurled rim 18. Retained in position between the disc 14 and the rim 18 by the fingers 15 is the female portion 19 of a securing element in which is provided a constricted neck portion 21 that projects out through an opening 22 in the flange 20.

The male portion 23 of the securing element is mounted in a section 24 of resilient material which is disposed in an opening in the visor disc 13. Washers 25 and 26 are provided to retain the section 24 and the male portion 23 of the securing element in position. By referring to Fig. 5 it may be seen that the washer 25 is disposed inwardly of an annular flange 27 provided on the male portion 23 while the washer 26 is disposed inwardly of an annular flange 28 on the male portion 23. There is provided in the female portion 19 of the securing element a recess 29 and adapted to frictionally engage the sides of this recess 29 are spring arms 30 which are mounted in the female portion 19 in any approved manner. Extending through the male portion 23 of the securing element is a plunger 31 on the inner end of which is provided an enlarged portion 32. A suitable finger gripping head or handle 33 is provided on the outer end of the plunger 31. It will be seen, therefore, by referring to Fig. 5, that the visor disc 13 may be mounted in operative position by pressing the plunger 31 inwardly until the enlarged portion 32 engages the spring arms 30 and spreads these arms apart against the sides of the recess 29 thereby securing the male portion 23 of the securing element to the female portion 19 and in this manner mounting the visor disc 13 in operative position. It is apparent, therefore, that visor disc 13 may be removed by withdrawing the plunger 31 from engagement with the spring arms 30 and out of the recess 29, thus separating the male and female portions of the securing element.

My invention includes a plurality of shock absorbing devices generically indicated at 34 and which are disposed between the visor disc 13 and the windshield 11 so as to eliminate danger of breaking of the disc 13 and rattling thereof due to the vibration of the vehicle. The shock absorbers 34 include a substantially frusto-conical portion 35 which is preferably made of glass and this portion 35 is attached to the inner side of the disc 13 by means of a suitable adhesive such as cement. Having leaves 36 disposed over the portion 35 is a band 37 which includes leaves 38 that are disposed over a bumper block 39 which is formed of resilient material such as rubber. It will be seen, therefore, that as the visor disc 13 is vibrated by shocks imparted to the windshield 11 by the vibration of the vehicle the resilient blocks 39 abut the windshield glass 11 and prevent breaking of the visor disc. It is apparent that the devices 34 including the blocks 39 are removable with the visor disc, being secured thereto.

From the foregoing description of my invention it is manifest that I have provided an improved visor for use on the windshields of automotive vehicles and it will be seen that while being simple and economical in construction and efficient in use my improved visor may be expeditiously mounted in operative position on a windshield and detached therefrom when not in use or needed as when driving on cloudy days.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In combination with the winshield of an automotive vehicle, a sun visor comprising a colored plate adapted to be mounted on one side of said windshield, and means for detachably mounting said plate on said windshield, said means comprising a securing element including a female portion carried by said windshield and a male portion carried by said visor, and means for detachably interconnecting said male and female portions, said last mentioned means including a plunger slidably mounted in said male portion and including spring jaw members mounted in said female portion, said plunger including an enlarged portion adapted to engage said jaw members whereby to secure said visor in operative position when said enlarged portion is in engagement with said jaw members.

2. An anti-glare visor comprising a transparent colored plate adapted to be positioned in front of a transparent member, and means for detachably securing said plate to said member including a female element carried by said member, and a male element carried by and slidably mounted in said plate for movement transversely therethrough, said male element being adapted to be inserted into and frictionally engaged in said female element to detachably secure said plate to said member.

3. An anti-glare visor comprising a transparent colored plate adapted to be positioned in front of a transparent member, and means for detachably securing said plate to said member including a female element carried by said member, and a male element carried by and slidably mounted in said plate, for movement transversely therethrough, said male element being adapted to be inserted into and frictionally engaged in said female element to detachably secure said plate to said member, said slidable male element including a finger gripping head positioned on the side of said plate opposite the side thereof facing said member.

4. An anti-glare visor comprising a transparent colored plate adapted to be positioned in front of a transparent member, and means for detachably securing said plate to said member including a female element carried by said member, and a male element carried by and slidably mounted in said plate, for movement transversely therethrough, said male element being adapted to be inserted into and frictionally engaged in said female element to detachably secure said plate to said member and including a handle portion positioned on the side of said plate opposite the side thereof facing said member, and shock absorbing bumper blocks carried by said plate and adapted to abut said member.

5. An anti-glare visor comprising a transparent colored plate adapted to be positioned in front of a transparent member, and means for detachably securing said plate to said member including a female element carried by said member, and a male element carried by and slidably mounted in said plate for movement transversely therethrough, said male element being adapted to be inserted into and frictionally engaged in said female element to detachably secure said plate to said member, said slidable male element including a finger gripping head positioned on the side of said plate opposite the side thereof facing said member, and shock absorbing bumper blocks carried by said plate and adapted to abut said member.

In testimony whereof I affix my signature.

PETER MILLER.